US012743185B2

(12) United States Patent
Weinberg

(10) Patent No.: US 12,743,185 B2
(45) Date of Patent: Sep. 22, 2026

(54) NON-FUNGIBLE TOKEN GALLERY

(71) Applicant: DISH Network L.L.C., Englewood, CO (US)

(72) Inventor: Joy Weinberg, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 221 days.

(21) Appl. No.: 18/655,758

(22) Filed: May 6, 2024

(65) Prior Publication Data

US 2024/0377919 A1 Nov. 14, 2024

Related U.S. Application Data

(60) Provisional application No. 63/501,788, filed on May 12, 2023.

(51) Int. Cl.
*G06F 3/04815* (2022.01)
*G06Q 20/36* (2012.01)
*H04L 9/32* (2006.01)

(52) U.S. Cl.
CPC ......... *G06F 3/04815* (2013.01); *G06Q 20/36* (2013.01); *H04L 9/3213* (2013.01)

(58) Field of Classification Search
CPC .................................................. G06F 3/04815
USPC ......................................................... 715/848
See application file for complete search history.

(56) References Cited

U.S. PATENT DOCUMENTS 12,121,820 B2 * 10/2024 Meyers .................. A63F 13/73
12,530,684 B2 * 1/2026 Hu ........................ G06Q 20/36
2022/0283630 A1 * 9/2022 Korpman ............... G06F 1/163
2023/0006976 A1 * 1/2023 Jakobsson ............... H04L 63/10
2023/0041807 A1 * 2/2023 Benedetto .......... G06Q 30/0645
2023/0042269 A1 * 2/2023 Benedetto ............. G06N 20/00
2023/0070389 A1 * 3/2023 Madhusudhan ..... G06Q 10/083
2023/0071093 A1 * 3/2023 Madhusudhan ... G06Q 30/0601
2023/0079127 A1 * 3/2023 Benedetto .............. A63F 13/69
2023/0093031 A1 * 3/2023 Sharda .................. G06N 20/00 705/39
2023/0123993 A1 * 4/2023 Meyers ................ H04L 9/3213 705/69
2023/0206216 A1 * 6/2023 Lehmann ............. G06F 21/645
2023/0351341 A1 * 11/2023 Lyren ..................... G06Q 30/06
2023/0360157 A1 * 11/2023 De Brouwer .......... G06V 20/40
2023/0419283 A1 * 12/2023 Le .......................... G06Q 30/04
2024/0185191 A1 * 6/2024 Bernardi ............. G06Q 20/065
2024/0202721 A1 * 6/2024 Hu ......................... G06Q 20/36
2024/0211909 A1 * 6/2024 Lal ..................... G06Q 20/1235
2024/0211910 A1 * 6/2024 Lal ..................... G06Q 20/1235
2024/0330882 A1 * 10/2024 Dearie ................. G06Q 20/065
2024/0330901 A1 * 10/2024 Satya Sivajee Pinnamaneni ........ G06Q 30/018

(Continued)

*Primary Examiner* — Reza Nabi

(74) *Attorney, Agent, or Firm* — Ashurst Perkins Coie US LLP

(57) ABSTRACT

The present disclosure is directed to methods and systems for displaying non-fungible tokens (NFTs) in a virtual environment, such as a virtual art gallery. The system can display NFTs in the gallery for a user to view, purchase, or sell NFTs. A user can view the NFTs in the gallery via an interface on a screen of a device or via a virtual reality or artificial reality device. The system can create a shopping experience for a user by displaying NFTs from multiple artists in a single virtual location. A user can travel throughout the NFT gallery to view, select, sell or purchase an NFT.

20 Claims, 8 Drawing Sheets

(56) References Cited

U.S. PATENT DOCUMENTS

| | | | | |
|---|---|---|---|---|
| 2024/0377919 | A1* | 11/2024 | Weinberg | G06Q 20/36 |
| 2024/0378592 | A1* | 11/2024 | Andresen, Jr. | G06Q 20/0655 |
| 2024/0428230 | A1* | 12/2024 | Rodriques Medina Andrade | G06Q 20/1235 |
| 2025/0014031 | A1* | 1/2025 | Arora | G06Q 20/401 |
| 2025/0050227 | A1* | 2/2025 | Meyers | A63F 13/67 |
| 2025/0069155 | A1* | 2/2025 | Mohite | G06Q 30/0206 |
| 2025/0224908 | A1* | 7/2025 | Hsu | G06K 19/06018 |

* cited by examiner 100
116
118
120
Network(s)
108
122
102a
102b
104
106
110
112
114

NON-FUNGIBLE TOKEN GALLERY

CROSS-REFERENCE TO RELATED APPLICATIONS

The present application claims priority to U.S. Provisional Patent Application No. 63/501,788, filed May 12, 2023, the entirety of which is hereby incorporated by reference.

BACKGROUND

Blockchain technology is used to transfer assets using tokens generated as part of a blockchain encryption process. An asset (e.g., an electronic coin, a blockchain-based good, a personal identifier, and so on) is represented by a chain of transactions that transfers ownership from one party to another party. To transfer ownership of an asset on a blockchain, a new transaction is generated and added to a stack of transactions in a block. The new transaction, which includes the public key of the new owner, is digitally signed by the owner with the owner's private key to transfer ownership to the new owner as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the asset. The blockchain creates a mathematical proof of ownership in an entity represented by a security identity (e.g., a public key), which can be pseudo-anonymous.

The blockchain technology can maintain a distributed ledger of transactions. With a distributed ledger, a ledger of all the transactions for an asset is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The blockchain system also implements techniques to ensure that each node will store the identical blockchain, even though nodes can receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The blockchain system also implements techniques to ensure that it would be infeasible to change a transaction and regenerate the blockchain by employing a computationally expensive technique to generate a nonce that is added to the block when it is created. A blockchain ledger is sometimes referred to as an Unspent Transaction Output ("UXTO") set because it tracks the output of all transactions that have not yet been spent.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for displaying NFTs in a virtual environment. The system can include a user interface that is used to display Non-Fungible Tokens (NFTs). NFTs are cryptographic, distributed ledger smart contracts and may be associated with digital art, in some cases with specific digital art as part of the token. Contrary to fungible tokens, each non-fungible token is unique. Generally, NFTs are often associated with the ownership of digital art. At least some embodiments are directed to assets (e.g., tangible and/or intangible assets) and services associated with the assets of the NFT and processes for creation and consumption of those assets. The assets can be artwork, such as digital artwork, stenciling, etc. An NFT is created (or "minted") by interacting with a smart contract on the blockchain.

The NFT display system can display NFTs in a gallery for a user to view and purchase/sell. The NFT display system can display details (e.g., price, date created, artist information, number of owners, etc.) for each NFT in the gallery. A user can view the NFTs in the gallery via an interface on a screen of a device or via a virtual reality or artificial reality (VR/AR) device (e.g., headset, glasses, etc.). The NFT display system can create a shopping experience for a user by displaying NFTs from multiple artists in a single virtual location. A user can travel throughout the NFT gallery to view and select NFTs. In some implementations, the NFT display system displays an NFT(s) that a user owns on a device (e.g., digital picture frame) to create a viewing experience (e.g., art gallery viewing) for viewers.

Figure 1:
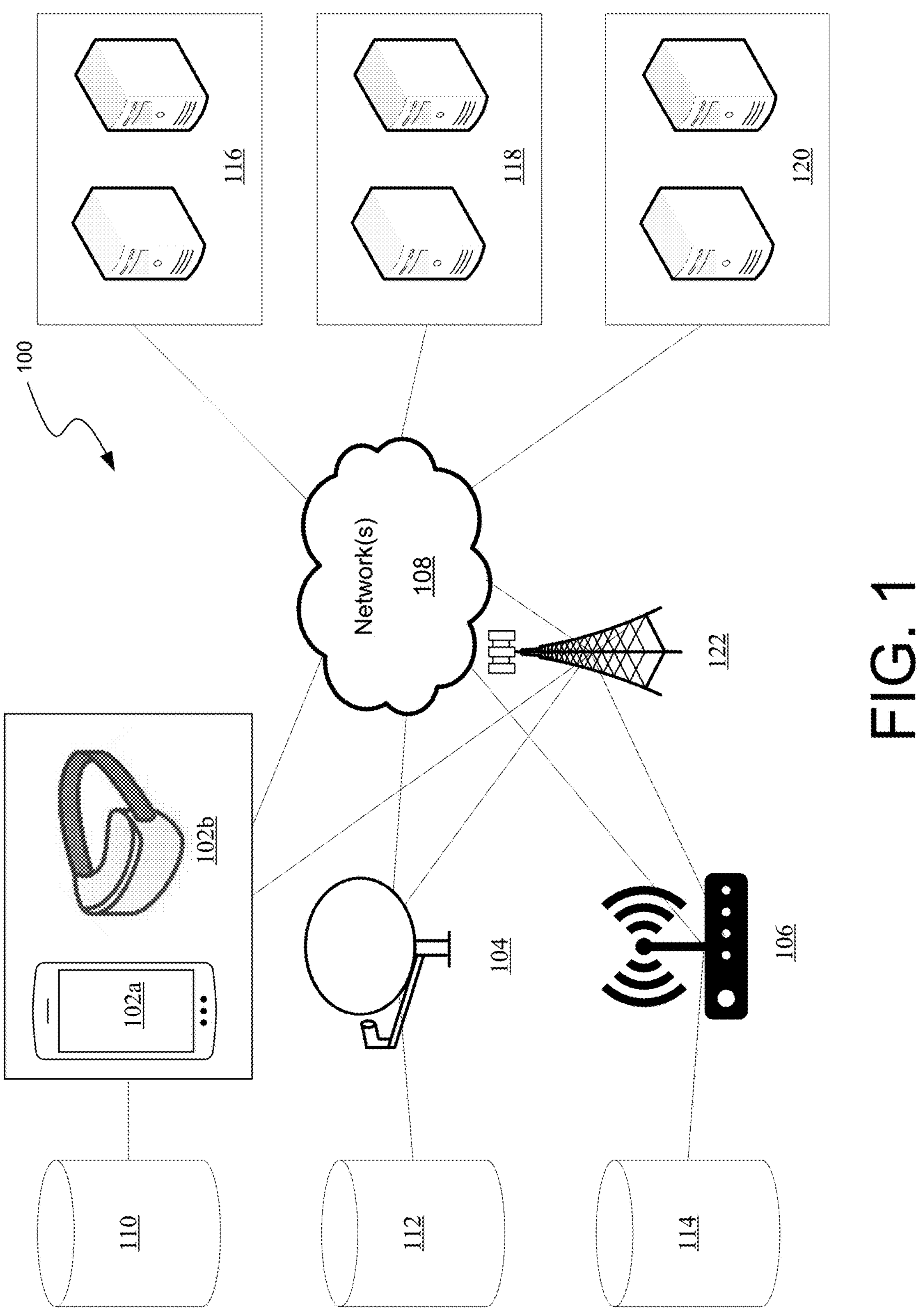
FIG. 1 illustrates an example of distributed system for displaying NFTs in a virtual environment.

FIG. 1 illustrates an example of a system for displaying NFTs in a virtual environment (e.g., VR/AR environment).

Example system 100 presented is a combination of interdependent components that interact to form an integrated whole of a wireless network. Components of the systems may be hardware components or software implemented on, and/or executed by, hardware components of the systems. For example, system 100 comprises client devices 102 (102*a* and 102*b*), 104, and 106, local databases 110, 112, and 114, network(s) 108, and server devices 116, 118, and/or 120.

Client devices 102, 104, and 106 may be configured to display NFTs in a virtual environment and monitor user activity in the virtual environment. In one example, a client device 102*a* may be a mobile phone, a client device 102*b* may be a VR/AR headset or glasses, a digital picture frame, a client device 104 may be a smart OTA antenna, and a client device 106 may be a broadcast module box (e.g., set-top box). In other example aspects, client device 106 may be a gateway device that is in communication with other gateway devices and multimedia content providers. Other possible client devices include but are not limited to tablets, personal computers, televisions, etc. In aspects, a client device, such as client devices 102, 104, and 106, may be equipped to access and/or locally store information (e.g., ledgers, private/public keys, smart contract, NFT information, etc.) associated with a blockchain network. In other aspects, a client device, such as client devices 102, 104, and 106, may access an NFT display virtual environment. Client devices 102, 104, and 106, may be equipped to monitor the activity (e.g., viewing NFTs, purchasing NFTs, selling NFTs, etc.) of a user. The signals that client devices 102, 104, and 106 may receive may be transmitted from satellite broadcast tower 122 and/or network(s) 108. Broadcast tower 122 (e.g., base station, gNB, etc.) may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the media content data from a channel from an OTA antenna (e.g., antenna 104). A graphical user interface may display on the mobile device 102 indicating the media content search results of certain local channels. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106. In some examples client devices 102, 104, and 106 may each have a local information (e.g., ledgers, private/public keys, smart contracts, etc.) of the blockchain network stored in local databases 110, 112, and/or 114. In other example aspects, the client devices 102, 104, and 106 may access a remotely-stored information via network(s), wherein the information may be stored on remote server(s) 116, 118, and/or 120.

Figure 2:
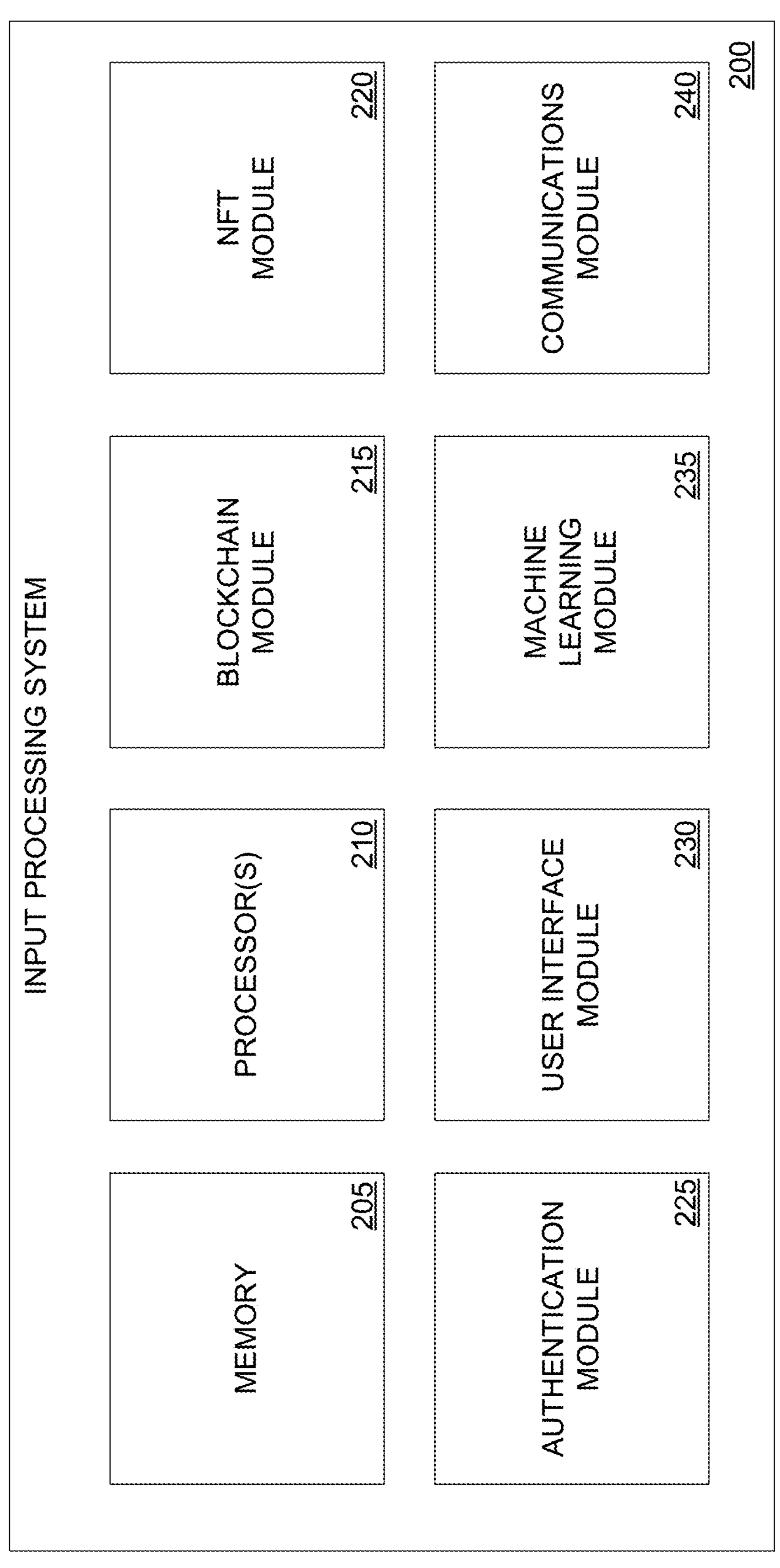
FIG. 2 illustrates an example input processing system for implementing systems and methods for displaying NFTs in a virtual environment.

FIG. 2 illustrates an example input processing system for implementing systems and methods for displaying NFTs in a virtual environment. The input processing system (e.g., one or more data processors) is capable of executing algorithms, software routines, and/or instructions based on processing data provided by a variety of sources related to displaying NFTs and monitoring users in a virtual environment. The input processing system 200 can be a general-purpose computer or a dedicated, special-purpose computer. According to the embodiments shown in FIG. 2, the disclosed system can include memory 205, one or more processors 210, blockchain module 215, NFT module 220, authentication module 225, user interface module 230, machine learning module 235, and communications module 240. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of blockchain module 215, NFT module 220, authentication module 225, user interface module 230, machine learning module 235, and communications module 240. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMS, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing network information (e.g., ledgers, private/public keys, etc.).

Blockchain module 215 provides blockchain functionality for the system. The blockchain module 215 allows for the creation of a new block for a new/existing blockchain distributed ledger, hashing of the new block, and addition of the new block to the user's private blockchain and distributed ledger. Examples of hash functions include different types of Secure Hash Algorithms (SHA-1, SHA-2, or SHA-3) or a Jenkins hash function. The blockchain module 215 can manage a plurality of public blockchains, private blockchains, and/or other distributed ledgers for users. In some implementations, the privacy of each user's blockchain(s) can be ensured because each user maintains an individual blockchain and/or ledger for the user's data. In other implementations, transactions include a public key that matches a private key associated with the user. In these implementations, while the transactions are added to a public ledger, details of the transactions can only be accessed when the private key is used, ensuring user data privacy. Blockchain module 215 is further configured to add new blocks to the blockchain when a user provides information to the network, sells an NFT, buys an NFT, or views an NFT. These new user activity (e.g., viewing/buying/selling an NFT) and/or devices may need to be recorded on a blockchain so future users participating in the blockchain system can successfully and accurately validate the user's newly acquired permissions.

The NFT module 220 is configured to create an NFT for a digital artwork that a user wants to display in the virtual environment and/or sell. The NFT module 220 can create an NFT by converting a digital art, associated metadata, and contract terms associated with the digital artwork into a smart contract. In some case, the smart contract is added to the blockchain or distributed ledger. The NFT module 220 can organize an NFT portfolio for a user based on monetary value, creation date, purchase date, or any criteria.

The authentication module 225 is configured to authenticate a user to access the NFT virtual environment. A user's authentication level can indicate whether the user has the ability to view, buy, and/or sell NFTs in the NFT virtual environment. In some implementations, the authentication module 225 utilizes multi-factor identification, such as requiring two types of authentication from an authentication group which includes blockchain, biometric, token, key, and/or geolocation types of authentication. Authentication module 225 provides token functionality for user authentication to access the NFT virtual environment. Authentication module 225 can generate a token for the user to access the NFT virtual environment. In some implementations, the token is valid for a threshold of time during which the user can access the NFT virtual environment. A user can request and receive a token from the authentication module 225. In some implementations, the authentication level of the user is based on a subscription package of the user. For example, a first subscription is required to view the NFTs in the virtual environment, a second subscription is required to purchase NFTs in the virtual environment, and a third subscription is required to sell NFTs in the virtual environment.

The user interface module 230 is configured to display NFTs to a user via a user interface on a device or a VR/AR device. The user interface module 230 can provide a user with the ability to zoom in/out in the virtual environment, navigate (e.g., scroll, "walk around", etc.) the virtual environment, or select NFTs. The user interface module 230 can display information about the NFT when a user selects an NFT. The information can include the NFT price, artist information, creation date, number of owners, duration on the market, or any information associated with the NFTs. In some implementations, the user interface module 230 displays the NFTs that a user owns as a device (e.g., digital frame.

Machine learning module 235 may be configured to monitor user activity (e.g., NFT preferences, artwork preferences, etc.) to identify/select NFTs for a user to purchase. The machine learning module 235 may be configured to monitor user activity based on at least one machine-learning algorithm trained on at least one dataset reflecting previously monitored user activity. The at least one machine-learning algorithms (and models) may be stored locally at databases and/or externally at databases (e.g., cloud databases and/or cloud servers). Client devices may be equipped to access these machine learning algorithms and intelligently analyze user data to identify NFTs to suggest to the user or select for the user based on at least one machine learning model that is trained on a historical user data. For example, if a user purchases an NFT, the user data may be collected to train a machine learning model to automatically identify/select similar NFTs (e.g., same genre of art, subject matter, etc.), and provide a recommendation to the user.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process network data and other data stores of user data to identify NFTs and provide a recommendation for the user to purchase. Based on an aggregation of data of user activity, network devices, and other user data stores, at least one ML model may be trained and subsequently deployed to automatically identify an NFT for a user to purchase. The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with network data. In such examples, the ML model may be locally cached by the client device. In some implementations, the machine learning module 235 identifies newly connected devices to the network and collect user data from the newly connected devices. machine learning module 235 can identify and select NFTs of interest to the user based on historical interests of the user and the user profile. For example, a user can input information about NFTs that they want to purchase into their profile when a user registers to access the virtual environment.

Communications module 240 is associated with sending/receiving information (e.g., NFT information, smart contracts, user information, or device information from blockchain module 215, NFT module 220, authentication module 225, user interface module 230, and machine learning module 235) with a remote server or with one or more client devices, streaming devices, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. Furthermore, communications module 240 may be configured to communicate network utilization and outage data to a client device and/or OTA box, smart OTA antenna, and/or smart TV, etc.

Figure 3:
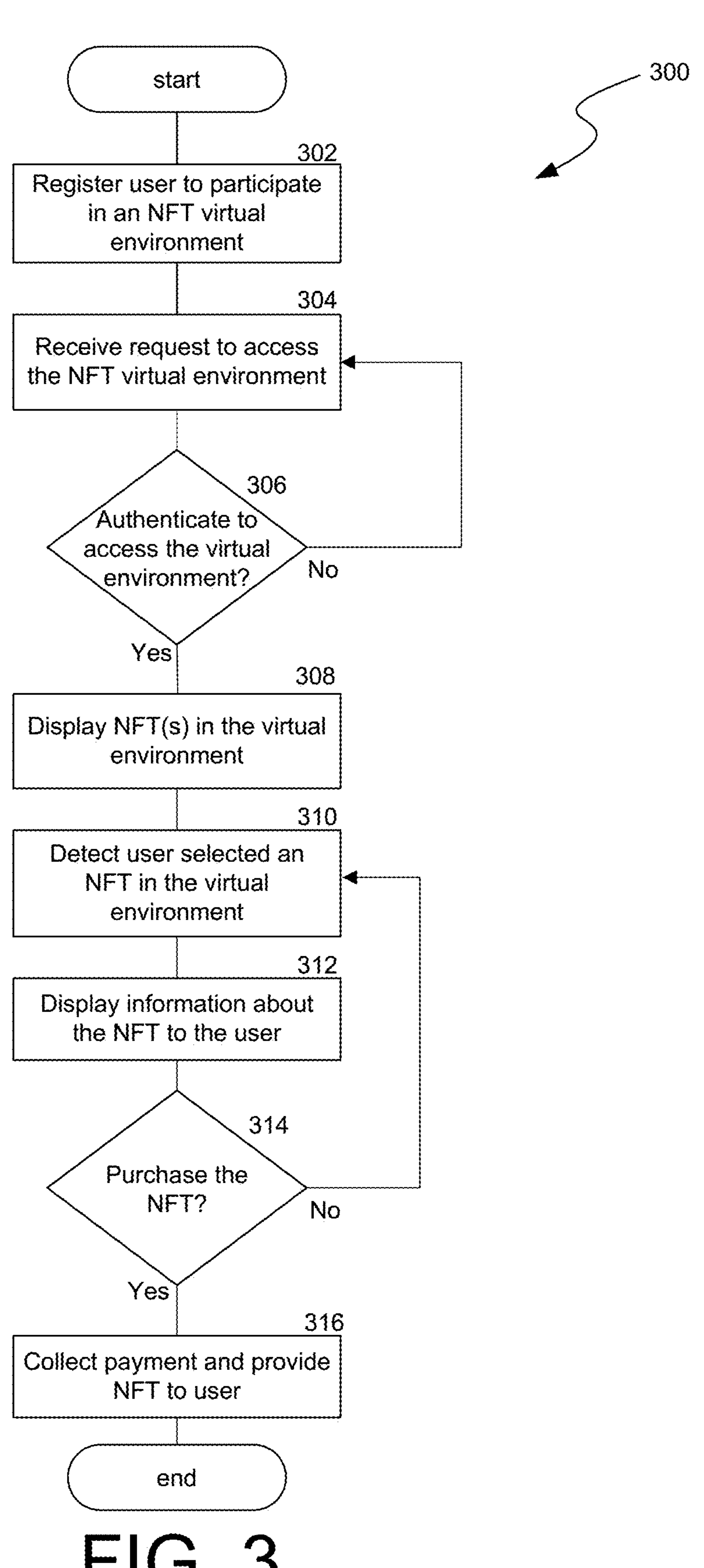
FIG. 3 is a flow diagram illustrating a process used in some implementations for a user to access a virtual environment to view an NFT.

FIG. 3 is a flow diagram illustrating a process 300 used in some implementations for a user to access a virtual environment to view an NFT(s). In some implementations, process 300 is triggered by a user activating a subscription (e.g., subscription to access the virtual environment), a device connecting to a blockchain network, powering on a device, a device connecting to a gateway (e.g., router), or the user downloading an application on a device. In various implementations, process 300 is performed locally on the user device or performed by cloud-based device(s) that can support connecting to and/or participating in an NFT virtual environment.

At block 302, process 300 registers a user to participate in an NFT virtual environment (e.g., NFT gallery). Process 300 can receive identification (e.g., IP address, MAC address, Universal Unique Identifier (UUID), global unique identifier (GUID), etc.) of the user device(s) that the user will utilize to access the NFT virtual environment. The registration can include the user providing interests in types of art, favorite genres of art, and budget for purchasing NFTs. In some cases, process 300 assigns a token to identify the user and/or user device. The registration can include a subscription (e.g., monthly fee, one time cost, etc.) to access the NFT virtual environment. Process 300 can collect user information from user input, surveys, queries, and/or social media accounts and generate a profile for the user.

At block 304, process 300 receives a request by a user to access the virtual environment. The user can provide access credentials, a token, or any form of authorization to access the virtual environment. In some implementations, the request to access the virtual environment is triggered by a device connecting to the network (e.g., blockchain network). The device (e.g., digital picture frame, set-top box, smart TV, tablet, laptop, smartphone, router, etc.) can be a gateway (node) in the network and can communicate with other devices. Process 300 can receive a token (e.g., personal access token) with an associated hash value from the device as part of the detection of the device, or the device can provide the token separately. In some implementations, process 300 identifies the token associated with the device when the device connects to the network. The token can identify the device, the associated user of the device, a user account, and/or the type of subscription (e.g., viewing, buying, or selling ability) of the user. The token can provide authorization that the user is permitted to access the NFT virtual environment. In some implementations, process 300 performs randomized or periodic checks to identify devices connected to the network.

Each device in the network may be configured with a particular hash value that is comprised of a private and public key, as well as a hash algorithm (e.g., SHA 256). A hash value may be generated by hashing the private and public keys of the device with the hash algorithm. The hash value may be associated with the device (e.g., set-top box, laptop, etc.). The hash value may also be correlated with the user subscription or access privileges in the NFT virtual environment. The subscription, access privileges, and device details may be stored on a blockchain, where a central authority (e.g., the distributed computing provider) and/or other devices in the network (e.g., other set-top boxes, smart TVs, mobile devices, etc.) can view the hash value and the details associated with that hash value. When a device requests to participate in the system, the request, device information, and user subscription may be recorded in a subsequent block on the blockchain. To verify whether a device is permitted to participate in the system, a comparison must be performed between the permissions of the user stored in the ledger and the request. For example, based on the user permissions (e.g., based on a subscription package) associated with each device, when a device connects to the system, the device is first validated to ensure the user is permitted to access the NFT virtual environment. If process 300 validates the request, the device may participate in the system. If process 300 does not validate the request, then the request will be denied, and the device will not be able to connect to the system and access the NFT virtual environment.

In some example aspects, other devices ("verification devices") in the network may perform this comparison. In some instances, the comparison may be in the form of a proof-of-coverage, proof-of-work, or proof-of-stake verification method. When a certain number of devices (e.g., 6) verify the requesting device's access to the system, the requesting device may be granted access. To incentivize the other devices in the network performing this verification step, the other devices may receive a reward/incentive (e.g., tokens, cryptocurrency, reduction in monthly bill, credit to apply to future bills, upgraded service packages, a share of stock, a coupon, a discount, an account credit, a statement credit, access to exclusive content, and an upgraded service package etc.) from the network and/or network provider. Once the device(s) is verified, process 300 can add the device to a whitelist so the distributed computing system can identify that the device is not a nefarious actor.

At block 306, process 300 determines whether the user is authenticated to access the NFT virtual environment. A user's authentication level can indicate whether the user has the capability to view, buy, and/or sell NFTs in the NFT virtual environment. In some implementations, the process 300 utilizes multi-factor identification, such as requiring two types of authentication from an authentication group which includes blockchain, biometric, token, key, and/or geolocation types of authentication. In some implementations, the authorization is valid for a threshold of time during which the user can access the NFT virtual environment. In some implementations, the authentication level of the user is based on a subscription package (e.g., view, buy, or sell ability) of the user. For example, if a user is granted access to the virtual environment, the user's privileges are based on their subscription package. In some cases, the authentication level or subscription package is based on a threshold of money the user can spend in the virtual environment. For example, a first subscription gives the user an ability to spend up to a threshold (e.g., $1000) while a second subscription gives the user an ability to spend above the threshold to purchase an NFT.

If the user is authorized to access the NFT virtual environment, process 300 grants the user access to the virtual environment. At block 308, process 300 displays NFTs in the virtual environment (e.g., NFT 602, 604, and 606 are displayed for users to view, select, sell, and/or buy in the NFT virtual environment 600 of FIG. 6A) for the user to view and/or purchase. Process 300 can display the artwork associated with the NFT or portions of the artwork in the virtual environment. A user can navigate (e.g., zoom in/out, "walk around", etc.) the virtual environment. Process 300 can create an NFT shopping experience for the user in the virtual environment. In some implementations, the NFTs in the virtual environment are interactive. A user can select an NFT, pick up the NFT, navigate around (e.g., 360 degrees) the NFT, view different angles of the NFT, enlarge or reduce the size of the NFT, or any action with the NFT.

In some implementations, an NFT is realized as a physical token.

At block 310, process 300 detects the user select an NFT. A user can select an NFT by clicking on the NFT on a screen or by virtually touching the NFT in the virtual environment. In some cases, the user selects an NFT by being within a proximity of the NFT within the virtual environment.

At block 312, process 300 displays information about the selected NFT to the user. The information can include the NFT price, artist information, creation date, number of owners, duration on the market, description of the artwork, or any information associated with the NFTs. Process 300 can display a comparison of information between the selected NFTs and the other NFTs in the virtual environment. For example, process 300 can compare costs of the NFTs and display the comparison near the selected NFT in the virtual environment.

At block 314, process 300 determines whether the user decides to purchase the NFT. The user can select a purchase icon nearby the NFT in the virtual environment or the user can select and hold the virtual representation of the NFT for a threshold time to indicate that the user wants to purchase the NFT. In some implementations, if the user's subscription or access credentials only allow the user to only view NFTs, when a user decides to purchase an NFT, process 300 can offer the user the ability to upgrade their subscription to be able to purchase the NFT. If the user is not purchasing the NFT, process 300 can continue to monitor whether the user selects an NFT (at block 310).

If the user is purchasing the NFT, at block 316, process collects payment from the user and provides the user the NFT. Process 300 can transfer ownership of the NFT on a blockchain by generating a new transaction and adding the new transaction to a stack of transactions in a block. Process 300 can transfer ownership of the NFT to the user via a smart contract. When payment is received, process 300 can transfer the NFT into the user's digital wallet. In some cases, the NFT sale is an auction in which buyers can place bids for the NFT.

Figure 4:
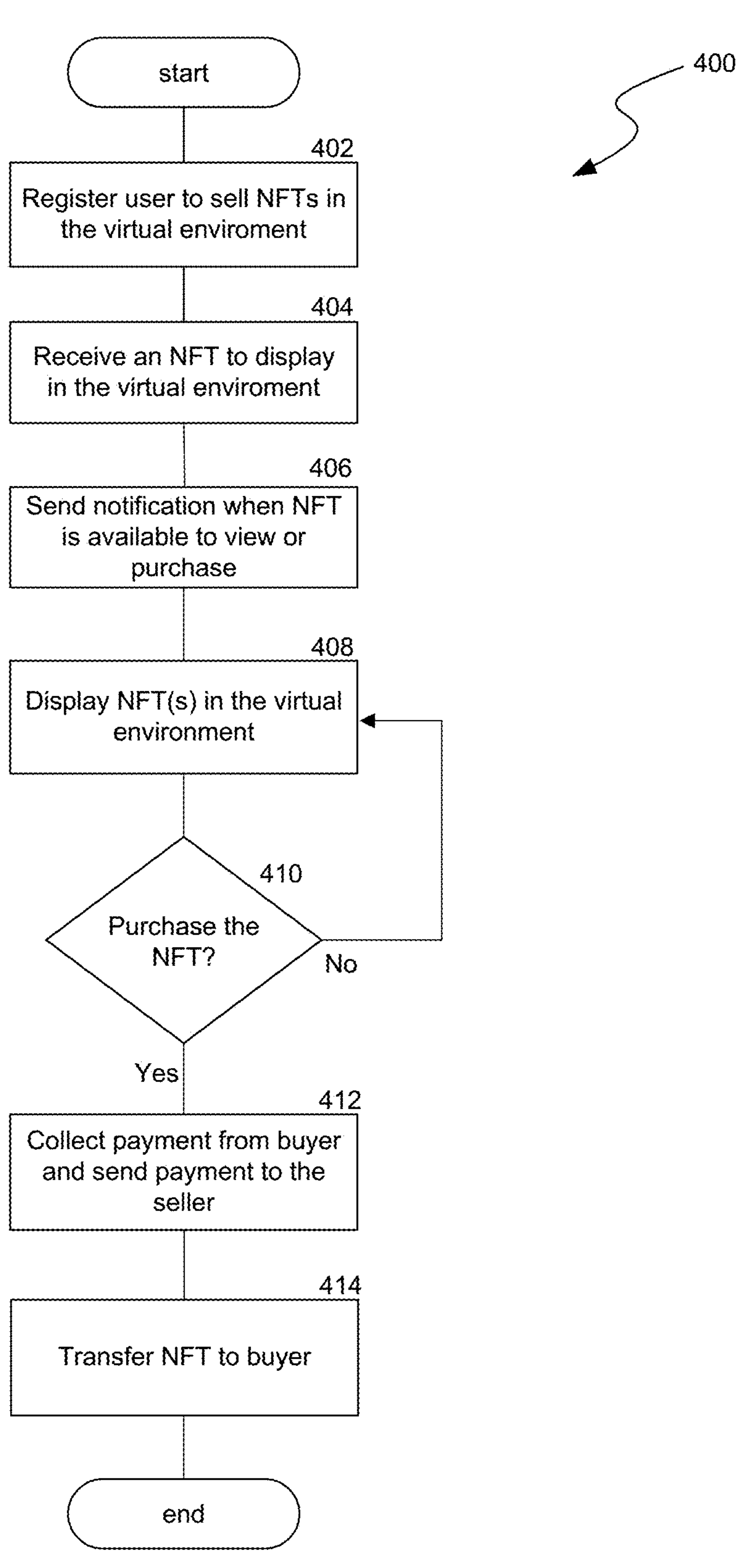
FIG. 4 is a flow diagram illustrating a process used in some implementations for a user to present NFTs in a virtual environment.

FIG. 4 is a flow diagram illustrating a process 400 used in some implementations for a user to present NFTs in a virtual environment. In some implementations, process 400 is triggered by a user activating a subscription (e.g., subscription to access the virtual environment), a device connecting to a blockchain network, powering on a device, a device connecting to a gateway (e.g., router), or the user downloading an application on a device. In various implementations, process 400 is performed locally on the user device or performed by cloud-based device(s) that can support connecting to and/or participating in an NFT virtual environment.

At block 402, process 400 registers a user to participate in an NFT virtual environment. Process 400 can receive identification (e.g., IP address, MAC address, Universal Unique Identifier (UUID), global unique identifier (GUID), etc.) of the user device(s) that the user will utilize to access the NFT virtual environment. The registration can include the user providing interests in types of art, favorite genres of art, and budget for purchasing NFTs. In some cases, process 400 assigns a token to identify the user and/or user device. The registration can include a subscription (e.g., monthly fee, one time cost, etc.) to access the NFT virtual environment. Process 400 can collect user information from user input, surveys, queries, and/or social media accounts and generate a profile for the user.

Process 400 can receive a request by a user (e.g., NFT seller, artist, etc.) to access the virtual environment. The user can provide access credentials, a token, or any form of authorization to access the virtual environment. In some implementations, the request to access the virtual environment is triggered by a device connecting to the network (e.g., blockchain network). The device (e.g., set-top box, smart TV, tablet, laptop, smartphone, router, etc.) can be a gateway (node) in the network and can communicate with other devices. Process 400 can receive a token (e.g., personal access token) with an associated hash value from the device as part of the detection of the device, or the device can provide the token separately. In some implementations, process 400 identifies the token associated with the device when the device connects to the network. The token can identify the device, the associated user of the device, a user account, and/or the type of subscription (e.g., viewing, buying, or selling ability) of the user. The token can provide authorization that the user is permitted to access the NFT virtual environment. In some implementations, process 400 performs randomized or periodic checks to identify devices connected to the network.

Each device in the network may be configured with a particular hash value that is comprised of a private and public key, as well as a hash algorithm (e.g., SHA 256). A hash value may be generated by hashing the private and public keys of the device with the hash algorithm. The hash value may be associated with the device (e.g., set-top box, laptop, etc.). The hash value may also be correlated with the user subscription or access privileges in the NFT virtual environment. The subscription, access privileges, and device details may be stored on a blockchain, where a central authority (e.g., the distributed computing provider) and/or other devices in the network (e.g., other set-top boxes, smart TVs, mobile devices, etc.) can view the hash value and the details associated with that hash value. When a device requests to participate in the system, the request, device information, and user subscription may be recorded in a subsequent block on the blockchain. To verify whether a device is permitted to participate in the system, a comparison must be performed between the permissions of the user stored in the ledger and the request. For example, based on the user permissions (e.g., based on a subscription package) associated with each device, when a device connects to the system, the device is first validated to ensure the user is permitted to access the NFT virtual environment. If process 400 validates the request, the device may participate in the system. If process 400 does not validate the request, then the request will be denied, and the device will not be able to connect to the system and access the NFT virtual environment.

In some example aspects, other devices ("verification devices") in the network may perform this comparison. In some instances, the comparison may be in the form of a proof-of-coverage, proof-of-work, or proof-of-stake verification method. When a certain number of devices (e.g., 6) verify the requesting device's access to the system, the requesting device may be granted access. To incentivize the other devices in the network performing this verification step, the other devices may receive a reward/incentive (e.g., tokens, cryptocurrency, reduction in monthly bill, credit to apply to future bills, upgraded service packages, a share of stock, a coupon, a discount, an account credit, a statement credit, access to exclusive content, and an upgraded service package etc.) from the network and/or network provider. Once the device(s) is verified, process 400 can add the device to a whitelist so the distributed computing system can identify that the device is not a nefarious actor.

Process 400 can determine whether the user is authenticated to access the NFT virtual environment. A user's authentication level can indicate whether the user has the ability sell NFTs in the NFT virtual environment. In some implementations, the process 400 utilizes multi-factor identification, such as requiring two types of authentication from an authentication group which includes blockchain, biometric, token, key, and/or geolocation types of authentication. In some implementations, the authorization is valid for a threshold of time during which the user can access the NFT virtual environment. In some implementations, the authentication level of the user is based on a subscription package (e.g., view, buy, or sell ability) of the user. For example, if a user is granted access to the virtual environment, the user's privileges are based on their subscription package. In some cases, the authentication level or subscription package is based on a threshold of NFTs the user is permitted to sell in the virtual environment. For example, a first subscription gives the user an ability to sell up to a threshold (e.g., 5 NFTs) while a second subscription gives the user an ability to sell above the threshold. If the user is authorized to access the NFT virtual environment, process 400 grants the user access to the virtual environment.

At block 404, process 400 receives an NFT from the user to display in the virtual environment. The user can provide information associated with the NFT for a potential buyer to access. The information can include the NFT price, artist information, creation date, number of owners, duration on the market, duration the NFT will be available for purchase in the virtual environment, description of the artwork, or any information associated with the NFT. At block 406, process 400 can send a notification to users, that can access the virtual environment, that the NFT is available to view and/or purchase. The notification can indicate the price of the NFT and the duration that the NFT is available for purchase. Process 400 can generate a notification periodically or whenever a new NFT is added to the virtual environment.

At block 408, process 400 displays the NFT in the virtual environment for potential buyers to view and/or purchase. Process 400 can display the artwork associated with the NFT or portions of the artwork. At block 410, process 400 determines whether a buyer has decided to purchase the NFT. If no buyers have decided to purchase the NFT, process 400 continues to display the NFT (at block 408).

If a buyer is purchasing the NFT, at block 412, process collects payment from the buyer and sends the payment to the seller. At block 414, process 400 transfers the ownership of the NFT from the seller to the buyer. Process 400 can transfer ownership of the NFT on a blockchain by generating a new transaction and adding the new transaction to a stack of transactions in a block. Process 400 can transfer ownership of the NFT to the buyer via a smart contract and transfer the NFT into the buyer's digital wallet.

Figure 5:
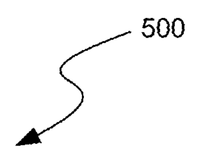
FIG. 5 is a flow diagram illustrating a process used in some implementations for displaying NFTs in a digital frame.
Figure 5:
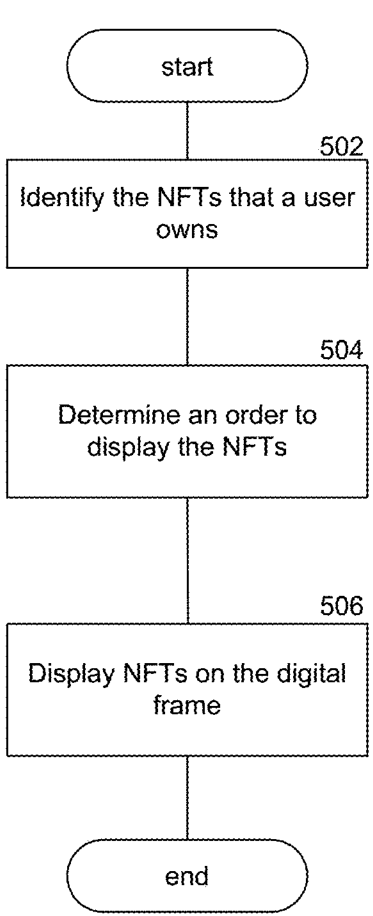

FIG. 5 is a flow diagram illustrating a process used in some implementations for a process 500 used in some implementations for displaying NFTs in a digital frame (e.g., user interface, screen, TV monitor, etc.). In some implementations, process 500 is triggered by a user activating a subscription (e.g., subscription to access the virtual environment), a device connecting to a blockchain network, powering on a device, a device connecting to a gateway (e.g., router), a user buying an NFT, or the user downloading an application on a device. In various implementations, process 500 is performed locally on the user device or performed by cloud-based device(s) that can support displaying NFTs on a digital frame.

At block 502, process 500 identifies the NFTs that a user owns. Process 500 can identify the NFTs based on the smart contracts that the user has participated in, transactions associated with the user, a token identifier, sending a query to the user, or searching a user's digital wallet. At block 504, process 500 determines an order to display the NFTs in the digital frame. The order is determined based on parameters such as, price of the NFT, duration the user has owned the NFT, or popularity of the NFT. In some implementations, the display order is randomly generated. At block 506, process 500 displays the NFTs on the digital frame (e.g., digital frame 650 displays NFT 652 in FIG. 6B). Process 500 can display an estimated price of the NFT's value or the purchase price of the NFT when an NFT is displayed.

Figure 6A:
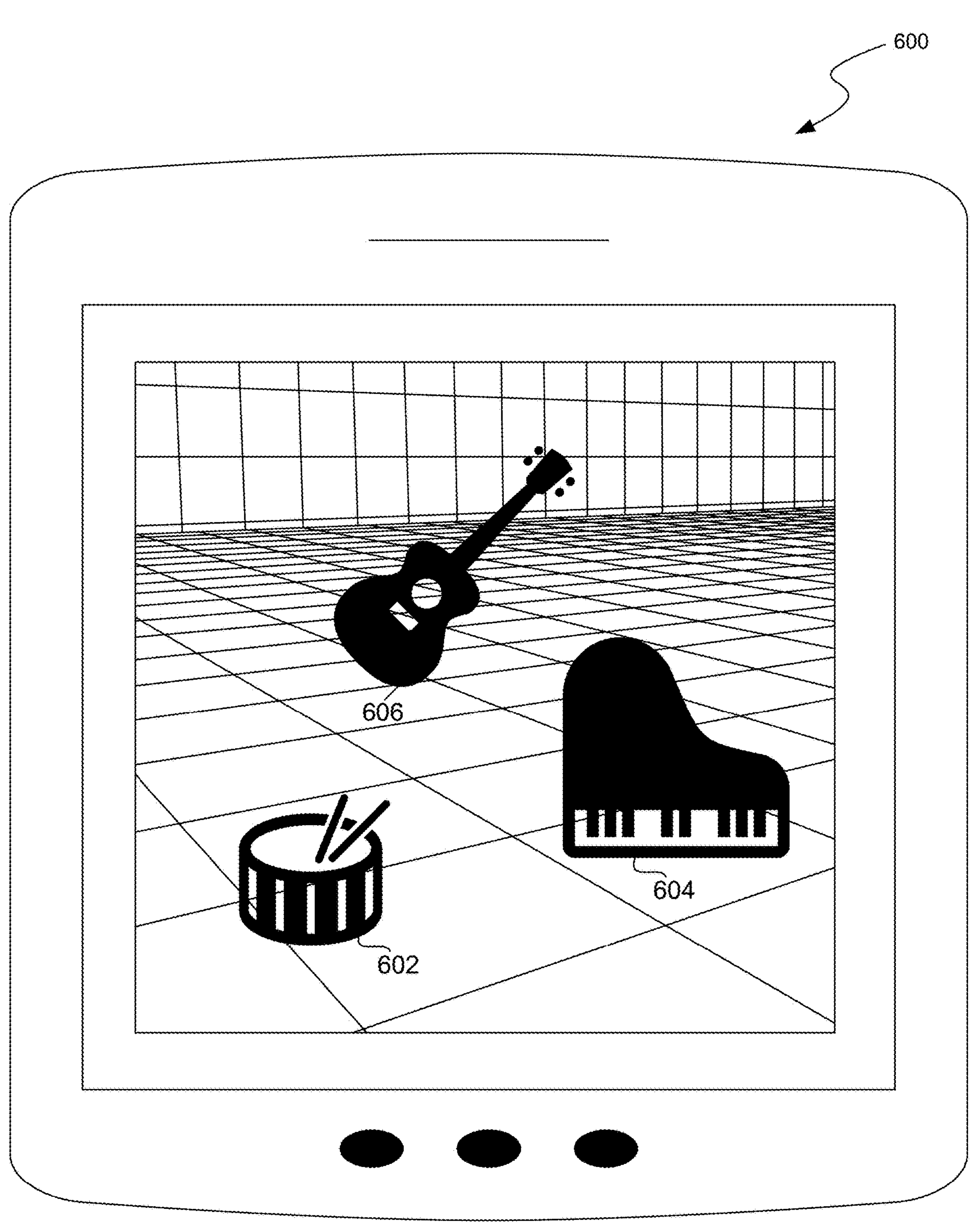
FIG. 6A is a conceptual diagram depicting an NFT virtual environment.
Figure 6B:
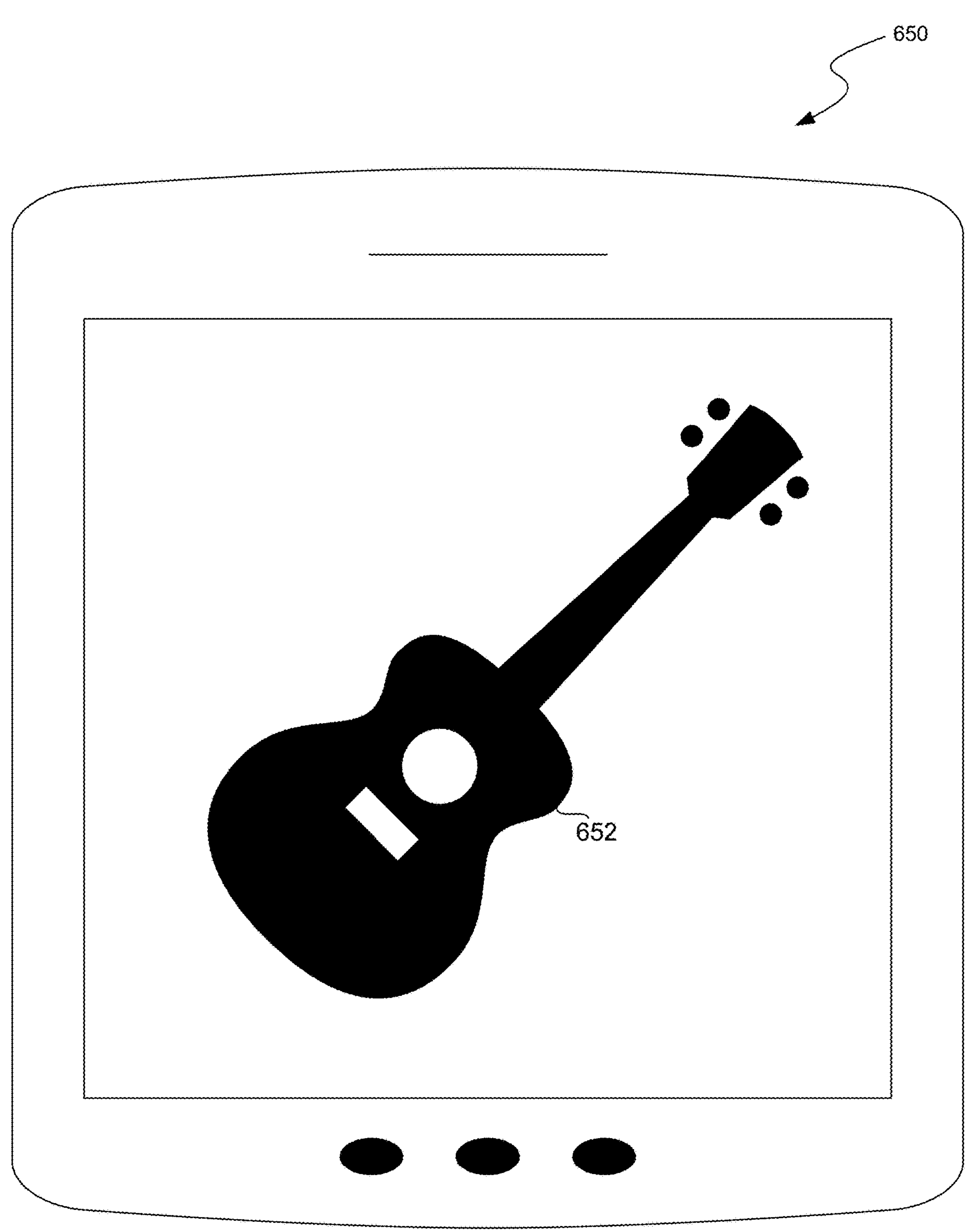
FIG. 6B is a conceptual diagram depicting an NFT digital frame.

FIG. 6A is a conceptual diagram depicting an NFT virtual environment 600. NFT 602, 604, and 606 are displayed for users to view, select, sell, and/or buy in the NFT virtual environment 600. FIG. 6B is a conceptual diagram depicting an NFT digital frame 650. The digital frame 650 displays NFT 652.

Figure 7:
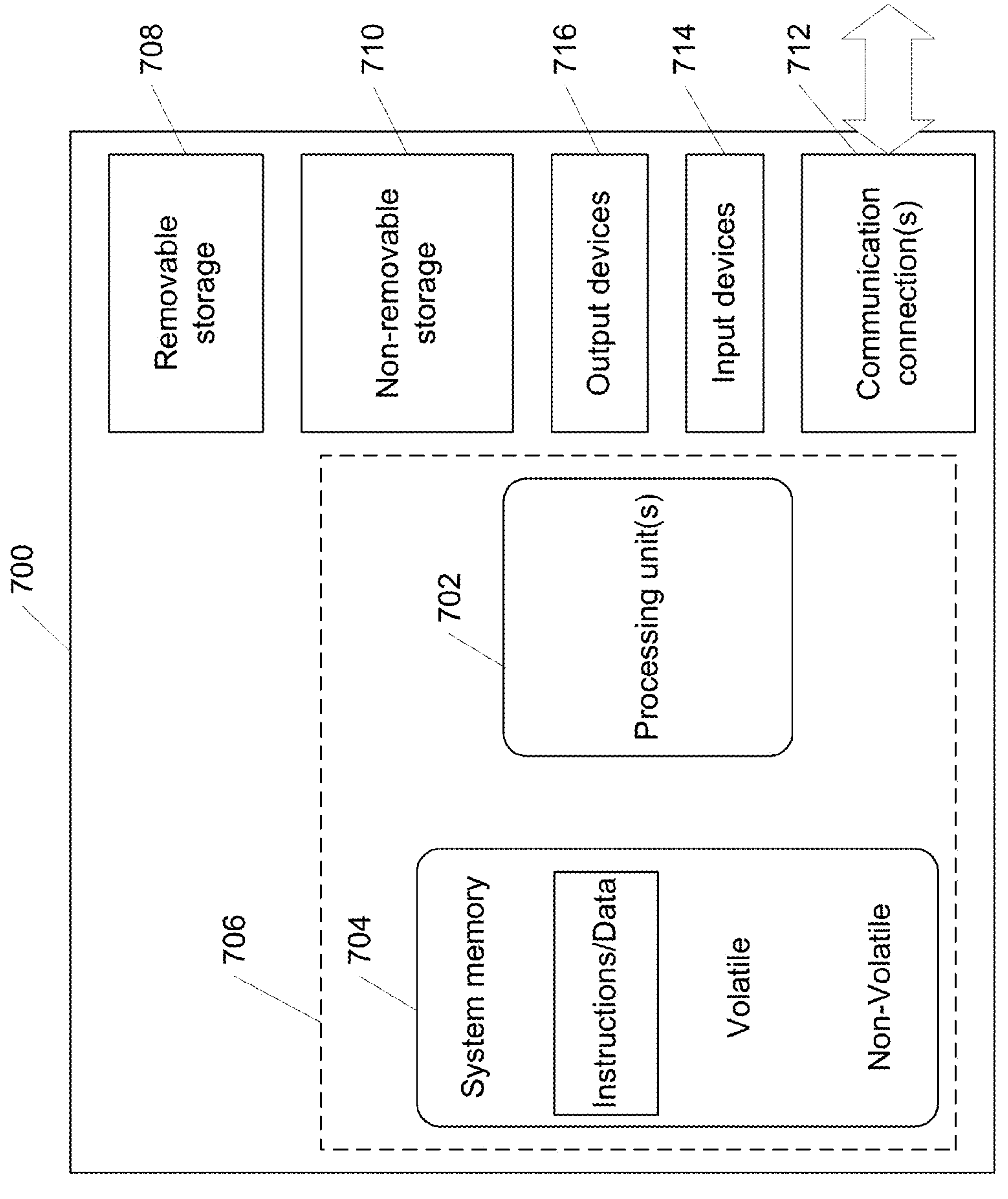
FIG. 7 illustrates one example of a suitable operating environment in which one or more of the present embodiments may be implemented.

FIG. 7 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable storage 708 and/or non-removable storage 710) including, but not limited to, magnetic or optical disks or tape. Similarly, environment 700 may also have input device(s) 714 such as keyboard, mouse, pen, voice input, etc., and/or output device(s) 716 such as a display, speakers, printer, etc. Also included in the environment may be one or more communication connections, 712, such as Bluetooth, WiFi, WiMax, LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 700 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for displaying non-fungible tokens in a virtual environment, the method comprising:

receiving a request for a user to access the virtual environment, wherein the virtual environment includes at least one non-fungible token, wherein the request includes at least one access credential associated with the user;

determining the user is authenticated to access the virtual environment based on the at least one access credential, wherein the at least one access credential indicates the user has viewing, buying, and selling privileges of non-fungible tokens in the virtual environment;

in response to determining the user is authenticated, displaying the at least one non-fungible token in the virtual environment;

detecting the user has selected the at least one non-fungible token based on a representation of the user being within a proximity of the at least one non-fungible token within the virtual environment; and displaying information associated with the at least one non-fungible token for the user to view.

2. The method of claim 1, further comprising:

in response to the user selecting the at least one non-fungible token, determining the user is purchasing the at least one non-fungible token;

collecting payment from the user; and sending the at least one non-fungible token to a digital wallet of the user.

3. The method of claim 1, further comprising:

in response to detecting the at least one non-fungible token is added to the virtual environment, sending a notification to the user, wherein the notification includes the information associated with the at least one non-fungible token.

4. The method of claim 1, further comprising:

in response to detecting the user has selected the at least one non-fungible token, displaying a comparison of the information associated with the at least one non-fungible token to information associated with one or more different non-fungible tokens available in the virtual environment.

5. The method of claim 1, wherein the at least one non-fungible token is displayed on a digital frame, and wherein the digital frame displays non-fungible tokens owned by the user.

6. The method of claim 1, wherein user activity in the virtual environment is analyzed and the at least one non-fungible token is selected by at least one machine-learning algorithm, wherein the at least one machine-learning algorithm is trained based on at least one dataset associated with previously analyzed user activity and selected non-fungible tokens.

7. The method of claim 1, wherein the information associated with the at least one non-fungible token includes one or more of a price, artist information, creation date, number of owners, duration the at least one non-fungible token is for sale, or a description of an art item associated with the at least one non-fungible token.

8. A system comprising:

one or more processors; and one or more memories storing instructions that, when executed by the one or more processors, cause the system to perform a process for displaying non-fungible tokens in a virtual environment, the process comprising:

receiving a request for a user to access the virtual environment, wherein the virtual environment includes at least one non-fungible token, wherein the request includes at least one access credential associated with the user;

determining the user is authenticated to access the virtual environment based on the at least one access credential, wherein the at least one access credential indicates the user has viewing, buying, and selling privileges of non-fungible tokens in the virtual environment;

in response to determining the user is authenticated, displaying the at least one non-fungible token in the virtual environment;

detecting the user has selected the at least one non-fungible token based on a representation of the user being within a proximity of the at least one non-fungible token within the virtual environment; and displaying information associated with the at least one non-fungible token for the user to view.

9. The system according to claim 8, wherein the process further comprises:

in response to the user selecting the at least one non-fungible token, determining the user is purchasing the at least one non-fungible token;

collecting payment from the user; and sending the at least one non-fungible token to a digital wallet of the user.

10. The system according to claim 8, wherein the process further comprises:

in response to detecting the at least one non-fungible token is added to the virtual environment, sending a notification to the user, wherein the notification includes the information associated with the at least one non-fungible token.

11. The system according to claim 8, wherein the process further comprises:

in response to detecting the user has selected the at least one non-fungible token, displaying a comparison of the information associated with the at least one non-fungible token to information associated with one or more different non-fungible tokens available in the virtual environment.

12. The system according to claim 8, wherein the at least one non-fungible token is displayed on a digital frame, and wherein the digital frame displays non-fungible tokens owned by the user.

13. The system according to claim 8, wherein user activity in the virtual environment is analyzed and the at least one non-fungible token is selected by at least one machine-learning algorithm, wherein the at least one machine-learning algorithm is trained based on at least one dataset associated with previously analyzed user activity and selected non-fungible tokens.

14. The system according to claim 8, wherein the information associated with the at least one non-fungible token includes one or more of a price, artist information, creation date, number of owners, duration the at least one non-fungible token is for sale, or a description of an art item associated with the at least one non-fungible token.

15. A non-transitory computer-readable medium storing instructions that, when executed by a computing system, cause the computing system to perform operations of displaying non-fungible tokens in a virtual environment, the operations comprising:

receiving a request for a user to access the virtual environment, wherein the virtual environment includes at least one non-fungible token, wherein the request includes at least one access credential associated with the user;

determining the user is authenticated to access the virtual environment based on the at least one access credential, wherein the at least one access credential indicates the user has viewing, buying, and selling privileges of non-fungible tokens in the virtual environment;

in response to determining the user is authenticated, displaying the at least one non-fungible token in the virtual environment;

detecting the user has selected the at least one non-fungible token based on a representation of the user being within a proximity of the at least one non-fungible token within the virtual environment; and displaying information associated with the at least one non-fungible token for the user to view.

16. The non-transitory computer-readable medium of claim 15, wherein the operations further comprise:

in response to the user selecting the at least one non-fungible token, determining the user is purchasing the at least one non-fungible token;

collecting payment from the user; and sending the at least one non-fungible token to a digital wallet of the user.

17. The non-transitory computer-readable medium of claim 15, wherein the operations further comprise:

in response to detecting the at least one non-fungible token is added to the virtual environment, sending a notification to the user, wherein the notification includes the information associated with the at least one non-fungible token.

18. The non-transitory computer-readable medium of claim 15, wherein the operations further comprise:

in response to detecting the user has selected the at least one non-fungible token, displaying a comparison of the information associated with the at least one non-fungible token to information associated with one or more different non-fungible tokens available in the virtual environment.

19. The non-transitory computer-readable medium of claim 15, wherein the at least one non-fungible token is displayed on a digital frame, wherein the digital frame displays non-fungible tokens owned by the user, and wherein the information associated with the at least one non-fungible token includes one or more of a price, artist information, creation date, number of owners, duration the at least one non-fungible token is for sale, or a description of an art item associated with the at least one non-fungible token.

20. The non-transitory computer-readable medium of claim 15, wherein user activity in the virtual environment is analyzed and the at least one non-fungible token is selected by at least one machine-learning algorithm, wherein the at least one machine-learning algorithm is trained based on at least one dataset associated with previously analyzed user activity and selected non-fungible tokens.

* * * * *